(12) United States Patent
Krieger (10) Patent No.: US 7,065,703 B2
(45) Date of Patent: *Jun. 20, 2006

(54) SYNCHRONIZATION OF A COMMUNICATIONS SYSTEM

(75) Inventor: Abraham Krieger, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/893,673

(22) Filed: Jul. 15, 2004

(65) Prior Publication Data

US 2004/0260985 A1    Dec. 23, 2004

Related U.S. Application Data

(63) Continuation of application No. 09/788,171, filed on Feb. 14, 2001, now Pat. No. 6,769,093.

(51) Int. Cl.
*H04L 7/00* (2006.01)

(52) U.S. Cl. .................................... 714/814; 375/293
(58) Field of Classification Search ............... 714/814, 714/815, 811, 799, 798, 789, 786, 775, 752; 370/335; 375/293, 219
See application file for complete search history.

(56) References Cited

U.S. PATENT DOCUMENTS 6,769,093 B1 *   7/2004   Krieger ..................... 714/814

* cited by examiner

*Primary Examiner*—Guy Lamarre
*Assistant Examiner*—Dipakkumar Gandhi
(74) *Attorney, Agent, or Firm*—Howrey LLP (57) ABSTRACT

A receiver in which sync data detection logic detects unencoded sync data at block boundaries of blocks encoded symbols received over a communications channel. Based on the detection of the sync data, the sync data detection logic determine synchronization information for one or more components of the receiver. It may also determine one or more system parameters by counting the number of symbols between successive instances of the sync data.

7 Claims, 9 Drawing Sheets

SYNCHRONIZATION OF A COMMUNICATIONS SYSTEM

This application is a continuation of U.S. patent application Ser. No. 09/788,171, filed Feb. 14, 2001 now U.S. Pat. No. 6,769,093, which is hereby fully incorporated by reference herein as though set forth in full.

BACKGROUND OF THE INVENTION

1. Field of the Invention

This invention relates generally to synchronization of a communications system, and, more specifically, to detecting block boundaries and synchronizing the system based on this information.

2. Related Art

In current satellite broadcast systems compliant with the DVB standard, a standard encoded MPEG frame begins with a known sync byte. This byte is inserted into the frame prior to encoding by the convolutional encoder in the transmitter, and hence is encoded along with the rest of the frame. At the receiver, a decoder decodes the frame, and the receiver synchronizes the system after detecting the presence of the known sync byte.

If the code has low coding gain, as is the case with the first iteration of an inner code in a serially concatenated turbo code, there is a serious risk that the receiver will not be able to detect the presence of the sync byte. Consequently, the receiver will not be able to function since synchronization of the system cannot be achieved.

In the Japanese Digital Satellite standard, a 'superframe header' contains several fields that convey system information to the receiver. This header does not perform any synchronization function. Thus, in order for this header to be interpreted, the receiver must already be synchronized and have knowledge of the location of this header. Accordingly, the acquisition process with such systems can be unduly prolonged. In addition, the header consumes system overhead, and thus adversely impacts system throughput.

SUMMARY

A receiver configured for use in a communications system is provided for receiving blocks of data with unencoded sync data at block boundaries. Sync data detection logic detects the presence of the sync data after the blocks have been demodulated by the demodulator, but before the symbols have been decoded. Upon detecting the presence of the sync data, the sync data detection logic determines block boundaries. It may also derive any phase rotation of the symbol constellation and determine whether or not spectrum inversion has occurred. It may then communicate the timing information to the other components of the receiver, which may include the inner and outer encoders, and bit de-interleaver, of a turbo decoder. It may also communicate the phase rotation/inversion information to the demodulator. Through these tasks, the sync data detection logic synchronizes the system.

Various parameters, codes rates and settings may be embedded or implied by the number of symbols between two consecutive instances of the sync data. Examples include the type and code rate of one or more encoders employed at the transmitter, and the number and location of any pilot symbols which may have been inserted into the block at the transmitter. By counting the number of symbols between successive instances of the sync data, the sync data detection logic can derive the parameters, code rates, and settings. The receiver can then configure itself to these parameters, code rates and settings without the need of providing this information through a block header or the like.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

A communications system comprises a transmitter and a receiver. In one embodiment, the system is a satellite communication system configured to transmit and receive blocks of MPEG data. A block diagram of one embodiment of the transmitter is illustrated in FIG. 1, and a block diagram of one embodiment of the receiver is illustrated in FIG. 2.

Figure 1:
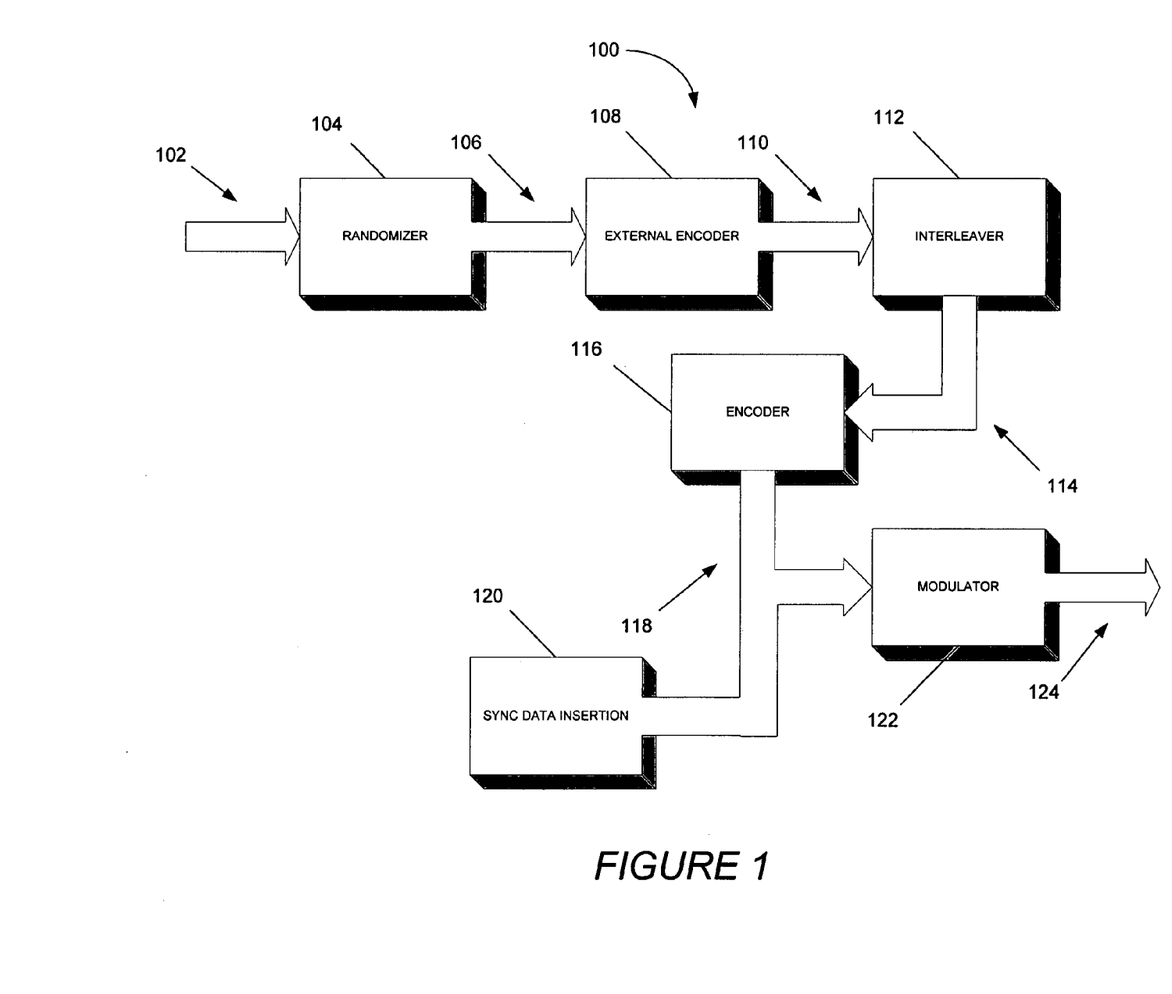
FIG. 1 is a block diagram of an embodiment of a transmitter according to the invention in which sync data insertion logic inserts sync data at the boundaries between encoded blocks.
Figure 2:
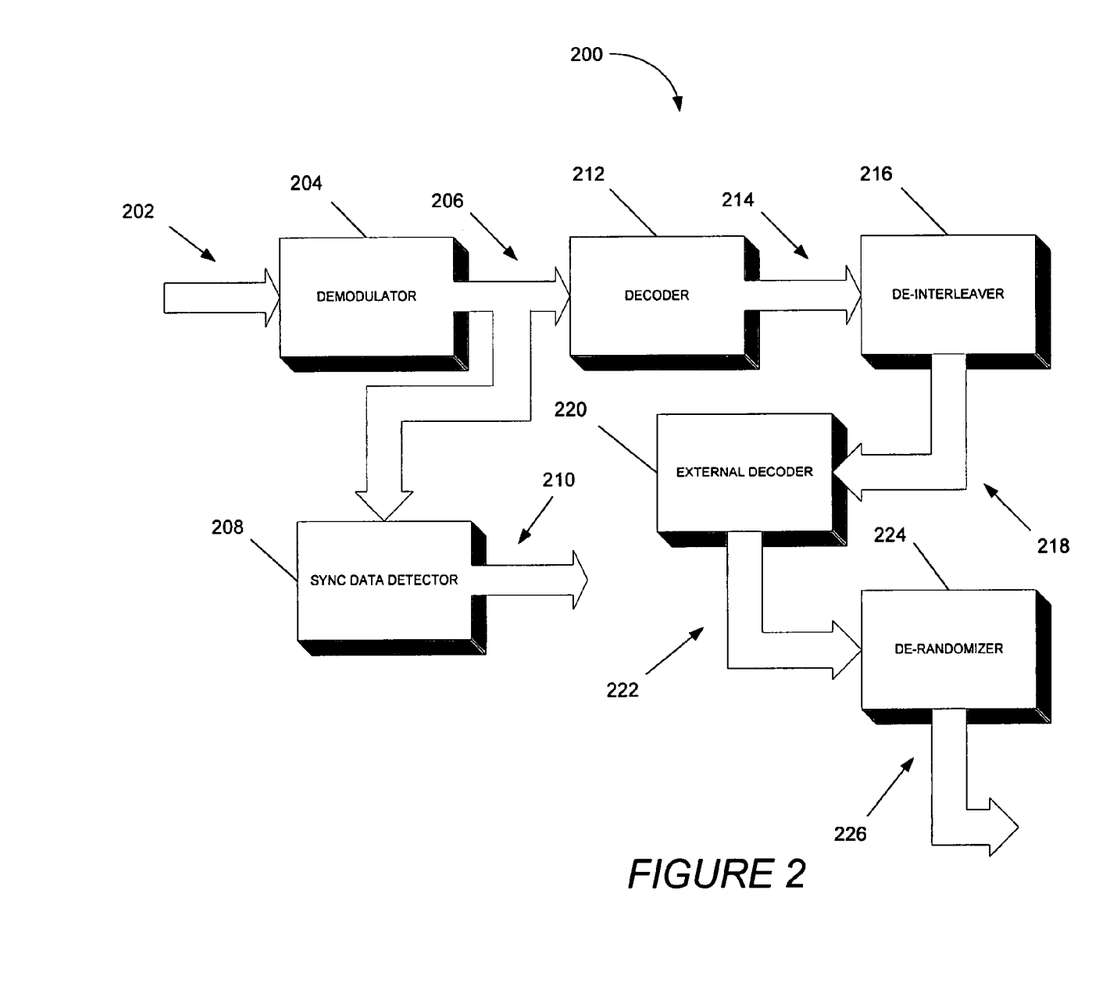
FIG. 2 is a block diagram of an embodiment of a receiver according to the invention in which sync data detection logic detects sync data within encoded symbols output by the demodulator.

With reference to FIG. 1, transmitter 100 comprises randomizer 104, external encoder 108, interleaver 112, encoder 116, sync data insertion logic 120, and modulator 122. In one implementation, the transmitter is configured to transmit blocks of MPEG data. For purposes of this disclosure, the term "block" means any grouping of data, such as a frame. In one implementation example, a block of MPEG data comprises a plurality of frames of MPEG data, with an MPEG frame comprising a 47 H sync byte followed by 187 bytes of information for a total of 188 bytes.

The incoming blocks of data are provided to randomizer 104 through input 102. The randomizer randomizes the bits in an incoming block, and provides the scrambled blocks to input 106 of external encoder 108. External encoder 108 adds parity information to each of the frames within the block. As is known, the parity information is added to permit error detection and correction at the receiver. In one embodiment, external encoder 108 may be a Reed-Solomon (R/S) or Cyclic Redundancy Check (CRC) encoder.

The block, including the parity information, is provided to interleaver 112 through input 110. In one embodiment, the interleaver 112 is a convolutional interleaver which interleaves the bytes within the block. As is known, the interleaver interleaves the bytes in the block in order to reduce burst error. The interleaved blocks from interleaver 112 are provided to input 114 of encoder 116.

Figure 4A:
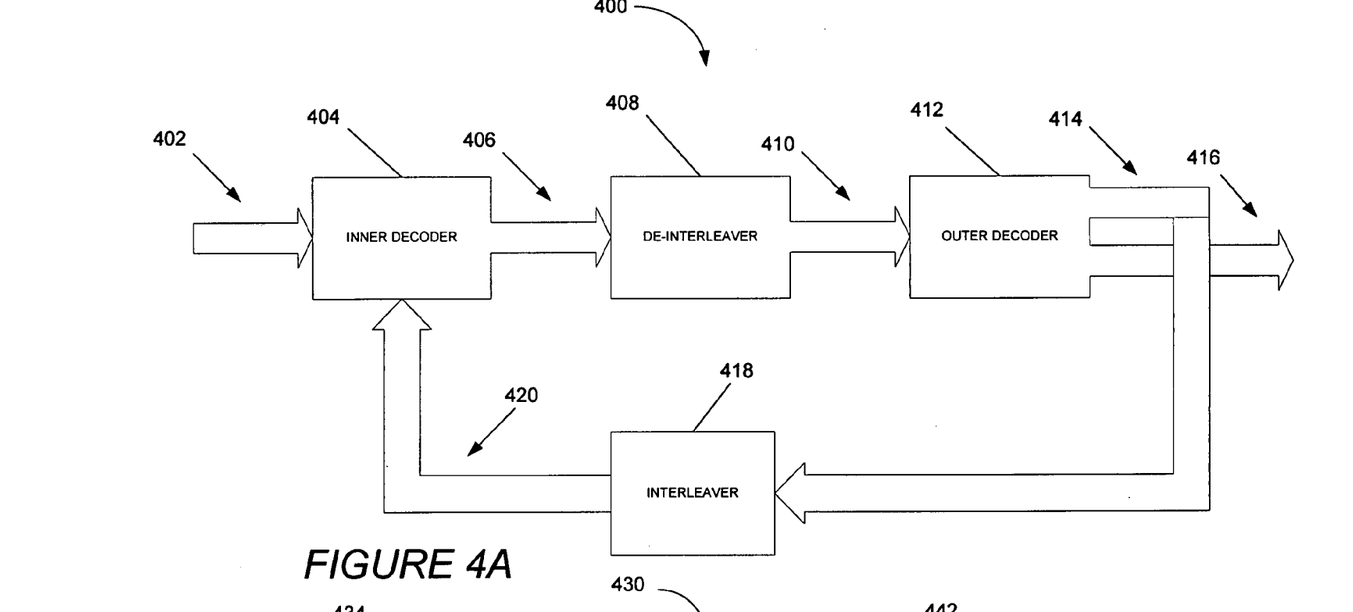
FIG. 4A is a block diagram of a serial turbo decoder.
Figure 4B:
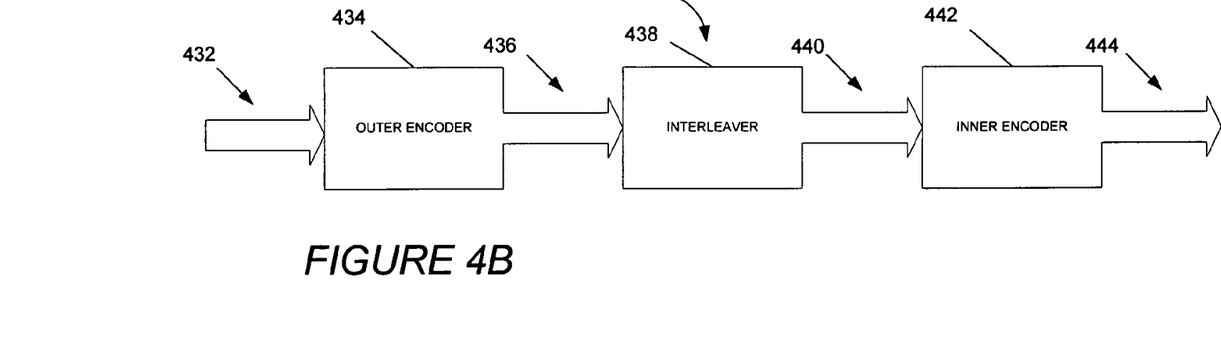
FIG. 4B is a block diagram of a serial turbo encoder.

In one embodiment, encoder 116 is a serially concatenated convolutional code (SCCC) encoder which, as illustrated in FIG. 4B, comprises a series combination of an outer encoder 434, an interleaver 438, and an inner encoder 442. A parallel-to serial converter (not shown) may be interposed between the outer encoder 434 and the interleaver 438, and a serial-to-parallel converter (not shown) may be interposed between interleaver 438 and inner encoder 442. Both of the outer and inner encoders 434, 442 in the SCCC encoder of FIG. 4B are convolutional encoders having prescribed rates and (optionally) puncturing protocols. The rates of the outer and inner encoders may be the different or the same. Also, each of these encoders may or may not be recursive, and may or may not be systematic. The interleaver 438 interleaves information at the bit level. The SCCC encoder of FIG. 4B has an overall rate defined by the products of the prescribed rates of the inner and outer encoders. For example, for an outer encoder having a rate of 4/5 and an inner encoder have a rate of 5/6, the overall rate of the SCCC encoder would be 2/3.

Figure 5:
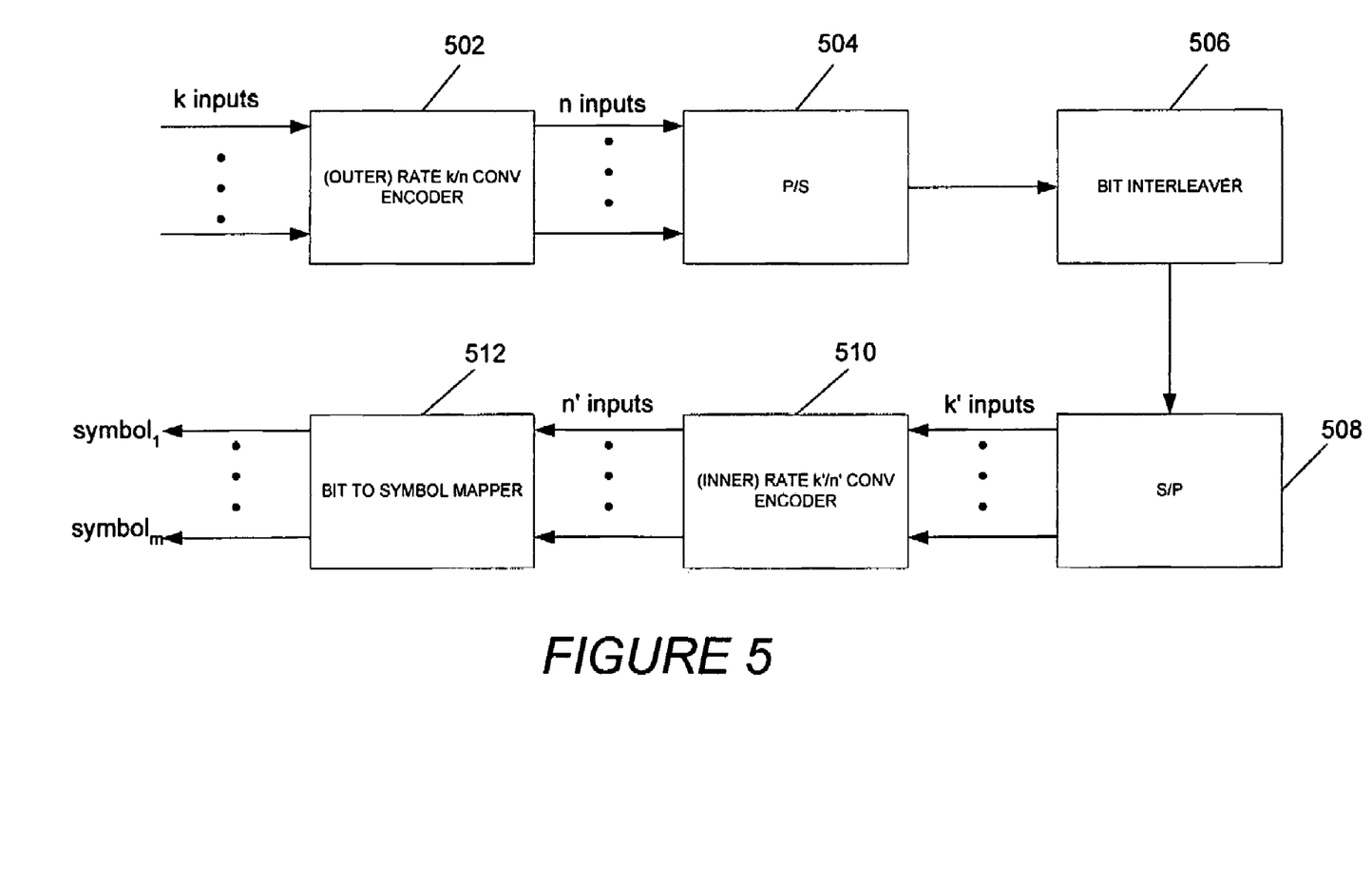
FIG. 5 is a block diagram of a serial concatenated trellis coded modulation (SCTCM) encoder.

In another embodiment, encoder 116 is a serially concatenated trellis coded modulation (SCTCM) encoder, which, as illustrated in FIG. 5, comprises the series combination of outer convolutional encoder 502, a parallel-to-serial converter 504, bit interleaver 506, serial-to-parallel converter 508, inner convolutional encoder 510, and bit to symbol mapper 512. As shown, outer convolutional encoder 502 is assumed to be a rate k/n encoder, parallel-to-serial (P/S) converter 504 serializes the n parallel bits output by encoder 502, bit interleaver 506 interleaves these bits, and serial-to-parallel converter 508 converts the serial bit stream from interleaver 506 into successive renditions of k' bits each. Inner convolutional encoder 510 is assumed to be a rate k'/n' encoder, and bit to symbol mapper converts each n' bit rendering from encoder 510 into m symbols.

In one example, encoder 510 is assumed to be a rate 5/6 encoder. Assuming an 8-PSK modulation scheme, such as that illustrated in FIG. 3, the bit-to-symbol mapper 512 maps each rendering of six bits from encoder 510 into two 8-PSK symbols. Assuming a 64-QAM modulation scheme, the bit-to-symbol 512 maps each rendering of six bits from encoder 510 into one 64-QAM symbol.

In this disclosure, the phrase "serial turbo encoder" will refer to an encoder formed from two serially concatenated convolutional encoders, with an interleaver (and possibly other components) in between, with or without a bit to symbol mapper. Therefore, it encompasses both SCCC and SCTCM encoders. It should be appreciated, however, that encoder 116 is not limited to a serial turbo encoder, and may encompass turbo encoders other than serial turbo encoders, such as parallel concatenated convolutional code encoders, or encoders other than turbo encoders, such as convolutional encoders.

In FIG. 1, the blocks of data are input to encoder 116 over input line 114. Encoder 116 encodes the blocks into blocks of encoded symbols, and outputs the blocks of encoded symbols on signal line 118. The blocks of encoded symbols from encoder 116 are output onto signal line 118. Sync data insertion logic 120 inserts unencoded sync data at the boundaries between successive blocks. For purposes of this disclosure, the term "logic" encompasses hardware, including but not limited to analog or digital circuitry, PLAs, ASICs, integrated circuit chips and the like, software, or a combination of hardware and software to perform a particular function. In addition, pilot symbols may be inserted at one or more locations throughout a block. These pilot symbols may be used to perform carrier phase tracking at the receiver.

The blocks of encoded symbols, including the inserted sync data and optionally the pilot symbols, are input to modulator 122. Modulator 122 modulates the symbols onto a carrier signal. In one implementation, each encoded symbol is a quadrature symbol having I and Q components, and the I and Q components each separately modulate carrier signals which are out of phase by 90° relative to one another. The separately modulated carrier signals are then combined and the combined signal transmitted through an antenna (not shown).

With reference to FIG. 2, receiver 200 comprises demodulator 204, sync data detection logic 208, decoder 212, de-interleaver 216, external decoder 220, and de-randomizer 224. One or more signals embodying the blocks of symbols as transmitted by transmitter 100 are passed over a communications channel and received by receiver 200. The channel may be a wireless or a wireline channel. In one implementation, the channel is a satellite broadcast channel. The one or more signals may be perturbed by noise which has been introduced through transmission over the channel. The one or more signals embodying the transmitted blocks are received by an antenna (not shown), and then provided to demodulator 204 over input line 202.

Demodulator 204 demodulates the one or more signals embodying the blocks to baseband frequencies, and also provides estimates of the symbols in the blocks. In one embodiment, the demodulator 204 provides soft estimates of the symbols, where a soft estimate comprises a symbol estimate and a measure of the reliability of that estimate.

Figure 3:
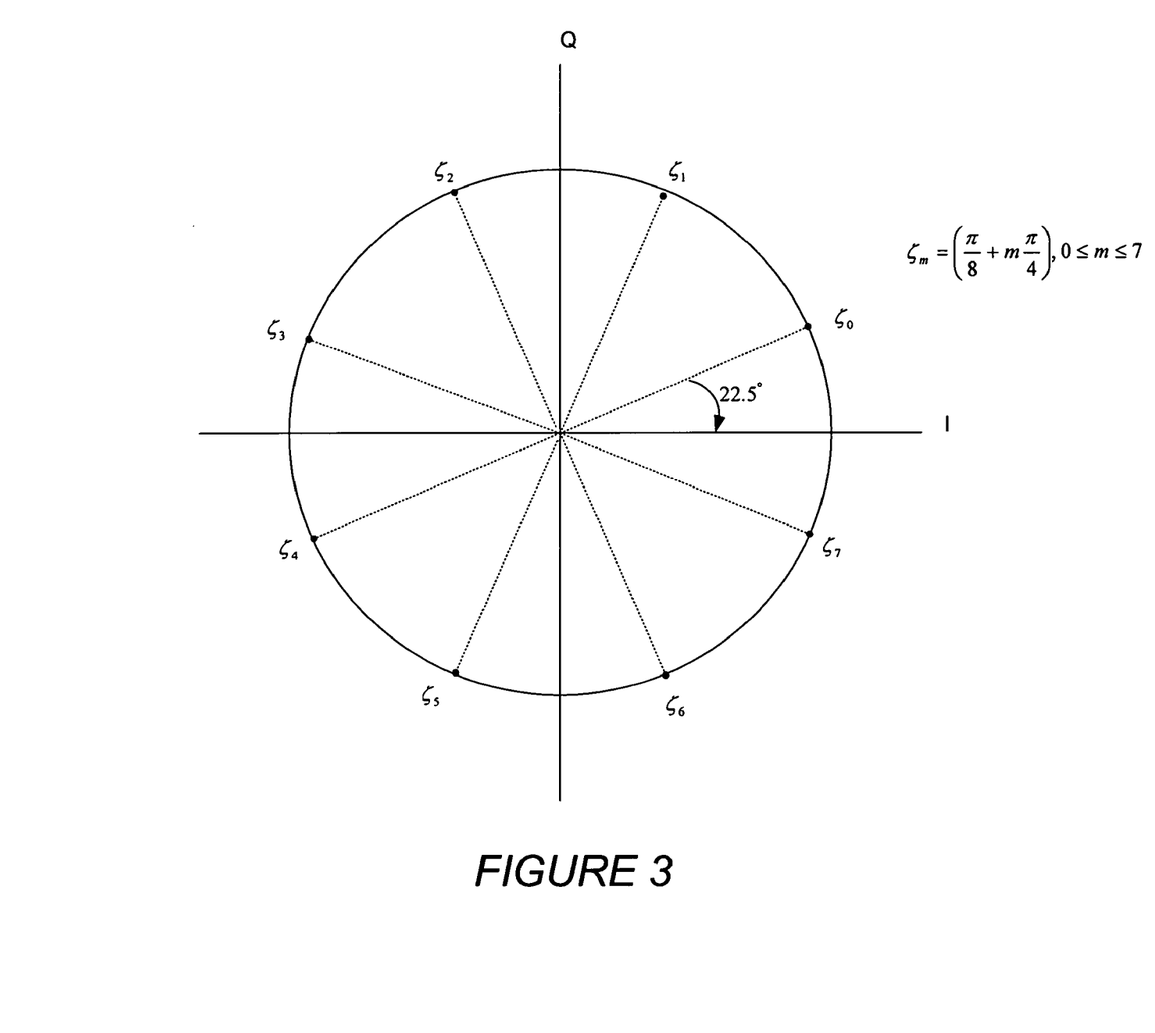
FIG. 3 illustrates an example of a phase rotated 8-PSK symbol constellation.

Initially, the demodulator 204 has no knowledge of the phase rotation of the symbol constellation applied at the transmitter for bit to symbol mapping. Thus, as far as the demodulator 204 is concerned, at least initially, any one of the symbols in the constellation is equally likely. Consider an example in which an 8-PSK symbol constellation is employed. FIG. 3 illustrates a particular 8-PSK symbol constellation which employs a Gray scale mapping in which adjacent combinations of symbols differ by no more than 1 bit. Initially, the demodulator 204 would have no way of knowing which of the eight possible transmitted phases correspond to the eight possible received phases. Thus, until the demodulator determines the rotation which occurs between transmitting and receiving, it is prone to error.

The estimates of the symbols are provided to sync data detection logic 208 over input line 206. The sync data detection logic 208 attempts to detect the presence of unencoded sync data in the stream of symbol estimates being provided by demodulator 204.

In one embodiment, where the symbol constellation employed at the transmitter is an 8-PSK symbol constellation, the sync data detection logic 208 comprises a bank of 16 correlators operating concurrently, in series, or in parallel. Each of the correlators attempts to correlate one of the eight possible phase-rotated versions of a common sync word (rotated respectively by 0°, 45°, 90°, 135°, 180°, 225°, 270°, and 315°) with the incoming estimates of quadrature symbols. A total of 16 correlators is provided to account for the 8 possible phase rotations, and the possibility of a spectrum inversion in which a quadrature symbol (I, Q) is inverted through demodulation to (I, −Q). In this embodiment, 8 of the correlators attempt to correlate a quadrature symbol (I, Q) from the demodulator with each of the eight possible phase-rotated versions of the sync word, and 8 of the correlators attempt to correlate the inverted quadrature symbol (I, −Q) with each of these eight possible phase-rotated versions of the sync word. In effect, each of the correlators corresponds to one of the 16 possible phase rotation and spectrum inversion hypotheses. For purposes of this disclosure, the phrase "sync word" means known sync data of any size or form, including but not limited to sync bytes or the like.

Upon detecting the presence of a sync word in the stream of quadrature symbols from the demodulator 204, the sync data detection logic 208 becomes aware of the location of a block boundary. From this information, the timing of subsequent block boundaries can be determined. If the block size is fixed, the timing of subsequent block boundaries can be determined by adding multiples of the block size to the location of the initially detected sync word. If the block size is dependent on system settings and parameters which can vary, the timing of subsequent block boundaries can be determined by detecting two successive sync words, determining the block size from the difference in the locations between the two sync words, or counting the number of symbols between the two sync words, and then adding multiples of the block size to the location of one of the initially detected sync words. Alternatively, once a sync word has been detected, the system can continue checking for the sync words at successive block boundaries, and derive the timing information from these subsequent detections. However derived, the timing information may then be provided to one or more of the remaining components of the receiver (through output line 210) so they can become synchronized.

In one example, encoder 116 at the transmitter is a SCTCM encoder and decoder 212 at the receiver is a serial turbo decoder. Assume that the inner encoder has a rate of 4/5, the outer encoder has a rate of 5/6, and the overall rate of the SCTCM encoder is 2/3. Assuming further that an 8-PSK symbol constellation is employed, the bit-to-symbol mapper in the SCTCM encoder outputs two 8-PSK symbols, symbol 1 and symbol 2, for each rendering of 6 bits from the outer encoder.

Prior to synchronization, the inner decoder within decoder 212 has no way of knowing which a particular symbol is symbol1 or symbol2 in the pair of symbols output by the SCTCM encoder. The inner decoder therefore utilizes the synchronization information to determine which symbol is which. The de-interleaver and outer decoder utilize this information for similar purposes.

The sync data detection logic 208 may also derive system settings, code rates and parameters which are embedded or implied by the number of symbols between two successive sync words. In one implementation, for example, the number of source bits in a block is fixed, but the number of encoded symbols in the block is a variable, depending on such factors as the overall rate of a serial turbo encoder in the transmitter, the type of external encoder employed in the transmitter, and the location and number of pilot symbols inserted into a block. By counting the number of symbols between two successive sync words, the receiver can thus determine parameters, code rates and settings such as this. This information may then be communicated to one or more of the components of the receiver 200 so they can configure themselves accordingly.

In one example, encoder 116 at the transmitter is a serial turbo encoder, and decoder 212 at the receiver is a serial turbo decoder. In this particular example, based on the overall rate of the serial turbo encoder employed at the transmitter, the receiver may further derive the rates of the inner and outer convolutional encoders in the turbo encoder. The rate of the inner encoder may be provided to inner decoder 404, which configures itself accordingly, and the rate of the outer encoder may be provided to outer decoder 412, which again configures itself accordingly.

As another example, an external encoder utilized at the transmitter may be a CRC or a Reed-Solomon (R/S) encoder. Since the choice of external encoder impacts block length, logic 208 can determine the external encoder type based on the number of symbols between two successive sync words.

Upon detecting a sync word, the sync data detection logic 208 may also determine the phase rotation applied to the symbol constellation at the transmitter, and whether a spectrum inversion has occurred. In the one embodiment in which the sync data detection logic 208 comprises a bank of 16 correlators, this information is simply determined from the particular hypothesis associated with the correlator which detected the presence of the sync word. Once determined, the sync data detection logic 208 may provide this information to the demodulator 204 (through output line 210). Demodulator 204 may then use this information to pre-rotate and/or invert the symbol estimates before providing them to the remaining components of the receiver. In particular, if a spectrum inversion is called for, and the incoming symbols are quadrature symbols, the demodulator 204 may invert the quadrature symbols, i.e., map (I, Q) into (I, −Q), before passing them on to the rest of the receiver. If a phase rotation of θ is detected, the demodulator may de-rotate each of the quadrature symbols by θ before passing the symbols on to the rest of the receiver. In one implementation, the demodulator may de-rotate a quadrature symbol after expressing it as a complex number in polar coordinates, and then multiplying the resultant symbol by the complex exponential $e^{-j\theta}$.

Decoder 212 is configured to decode the quadrature symbols (after correction for spectrum inversion and phase rotation) into underlying bits. In one embodiment, in which a serial turbo encoder is employed at the transmitter, decoder 212 has a configuration as illustrated in FIG. 4A. As illustrated, in this embodiment, the decoder 212 comprises the series combination of inner decoder 404, de-interleaver 408, and outer decoder 412. In addition, a feedback loop couples an output 414 of outer decoder 412 to an input of inner decoder 404. An interleaver 418 is placed along the feedback path. A symbol to bit mapper (not shown) may also be included to map the pre-rotated symbols from demodulator 204 into encoded bits before inner decoder 404 is allowed to operate on the symbols. In this disclosure, the phrase "serial turbo decoder" will refer to the series combination of inner and outer decoders with a de-interleaver (and possibly other components such as parallel-to-serial (P/S) or serial-to-parallel (S/P) converters) in between, where an output of the outer decoder is coupled to an input of the inner decoder through a feedback loop from the second decoder to the first, with an interleaver (and possibly other components) placed along the feedback loop. It should be appreciated, however, that decoder 212 is not limited to serial turbo decoders, but may encompass decoders other than serial turbo decoders, and turbo decoders other than parallel concatenated convolutional code decoders.

When embodied as a serial turbo decoder, the operation of the decoder 212 is iterative. After a prescribed number of iterations, the outer decoder 412 produces soft estimates of the underlying source bits on signal line 416.

In FIG. 2, source bit estimates from the decoder 212 are provided to de-interleaver 216 over input line 214. In response, de-interleaver 216 de-interleaves the estimates. In one embodiment, the de-interleaver 216 is a convolutional de-interleaver.

The output from de-interleaver 216 is then input to external decoder 220 over signal line 218. In one embodiment, the external decoder 220 performs error detection or correction on a frame by frame basis using the parity information provided in each frame.

The decoded bits from external decoder 220 are input to de-randomizer 224 over input line 222. De-randomizer 224 de-randomizes the bits in the block and thereby seeks to reverse the randomization introduced by randomizer 104 in the transmitter.

From the foregoing, it will be seen that a synchronization procedure has been described and illustrated for a communications system in which unencoded sync words mark the boundaries between successive blocks of encoded symbols, in which the phase rotation of the symbol constellation and the presence or lack thereof of spectrum inversion can be determined from the sync data, and in which system parameters, code rates, and settings implied by the number of symbols between successive sync words may be derived simply by counting the number of symbols between successive sync words. Since the sync word is unencoded, it can be detected by the receiver regardless of the coding gain of the encoder at the transmitter. Moreover, the system parameters, code rates, and settings can be determined without the need for block or frame headers (other than the sync word needed for synchronization) which consume excess overhead and reduce throughput.

Figure 6:
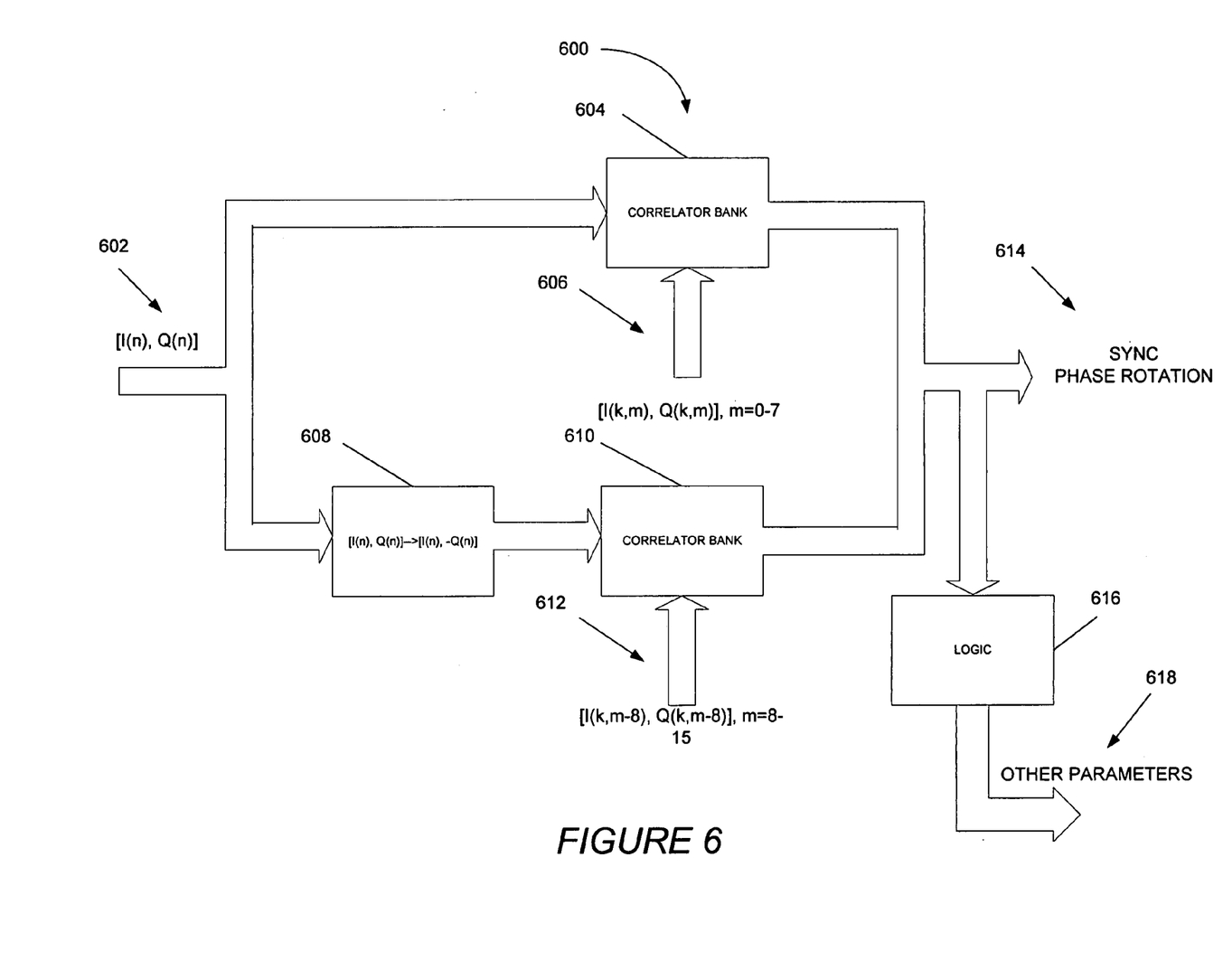
FIG. 6 is a block diagram of one implementation of sync data detection logic.

An embodiment of the sync data detection logic 208 is illustrated in FIG. 6. This embodiment comprises 16 different correlators which are configured to operate concurrently or in parallel. Eight of these correlators are identified with numeral 604, and the other eight of these correlators are identified with numeral 610. The eight correlators identified with numeral 604 are identified respectively with values 0 to 7 of the index m. The eight correlators identified with numeral 610 are identified respectively with values 8 to 15 of the index m.

Incoming quadrature symbols from the demodulator 204 are input on signal line 602. The quadrature symbols received at time n are referred to in the figure with the notation [I(n), Q(n)]. These quadrature symbols are directly input to each of the eight correlators identified with numeral 604. In addition, these quadrature symbols are also inverted by inverter 608 whereby the symbols [I(n), Q(n)] are translated to [I(n), −Q(n)]. The inverted quadrature symbols are input to each of the eight correlators identified with numeral 610.

In this embodiment, the sync word is a known sequence of N [I, Q] pairs, and each of the correlators correlates the incoming symbols from the demodulator with a phase-adjusted value of this sync word. Letting the index m refer to the 16 possible combinations of phase rotation and spectrum reversal which are possible with an 8-PSK symbol constellation, and letting k refer to a particular symbol pair within the sync word, where k ranges from 0 to N−1 (as indicated by numerals 606 and 612), the adjusted sync word which is applied by a particular correlator can be referred to with the notation [I(k,m), Q(k,m)], where m ranges from 0 to 15, and k ranges from 0 to N−1. In one embodiment, letting [I(k,0), Q(k,0)], $0 \leq k \leq N-1$, refer to the symbols of the sync word with no phase rotation, the phase rotated versions of this sync word, [I(k,m), Q(k,m)], $0 \leq k \leq N-1$, $\forall m$, bear the following relationship to the unadjusted sync word [I(k,0), Q(k,0)], $0 \leq k \leq N-1$, $\forall m$:

For $0 \leq m \leq 7$:  (1)

[I(k,1), Q(k,1)]=[(Q(k,0), I(k,0)], $0 \leq k \leq N-1$

[I(k,2), Q(k,2)]=[−Q(k,0), I(k,0)], $0 \leq k \leq N-1$

[I(k,3), Q(k,3)]=[−I(k,0), Q(k,0)], $0 \leq k \leq N-1$

[I(k,4), Q(k,4)]=[−I(k,0), −Q(k,0)], $0 \leq k \leq N-1$

[I(k,5), Q(k,5)]=[−Q(k,0), −I(k,0)], $0 \leq k \leq N-1$

[I(k,6), Q(k,6)]=[Q(k,0), −I(k,0)], $0 \leq k \leq N-1$

[I(k,7), Q(k,7)]=[I(k,0), −Q(k,0)], $0 \leq k \leq N-1$ and for $8 \leq m \leq 5$:

[I(k,m), Q(k,m)]=[I(k,m−8), Q(k,m−8)]

In one implementation, the index m associated with a particular correlator identifies a particular hypothesis of phase rotation and spectrum inversion being tested by the correlator. The following table illustrates one example of the relationship between m and the hypothesis under examination:

| Index | Phase Rotation | Spectrum Inversion |
| --- | --- | --- |
| 0 | 0° | No |
| 1 | 45° | No |
| 2 | 90° | No |
| 3 | 135° | No |
| 4 | 180° | No |
| 5 | 225° | No |
| 6 | 270° | No |
| 7 | 315° | No |
| 8 | 0° | Yes |
| 9 | 45° | Yes |
| 10 | 90° | Yes |
| 11 | 135° | Yes |
| 12 | 180° | Yes |
| 13 | 225° | Yes |
| 14 | 270° | Yes |
| 15 | 315° | Yes |

As symbols are provided by the demodulator, each of the correlators determines a correlation value indicating the degree of correlation between a grouping of N pairs of input symbols and the phase-adjusted sync word applied by the correlator. In one embodiment, the correlation value for the mth correlator, where m ranges from 0 to 15, at time n, is given by the following expressions:

$$Corr(n, m) = 1/N \sum_{k=0}^{N-1} I(k, m)I(n+k) + Q(k, m)Q(n+k), \quad (2)$$

$$m = 0, 1, \ldots, 7$$

$$Corr(n, m) = 1/N \sum_{k=0}^{N-1} I(k, m-8)I(n+k) - Q(k, m-8)Q(n+k),$$

$$m = 8, 9, \ldots, 15$$

In these expressions, I(n+k) refers to the in-phase component of a quadrature symbol at time n+k, Q(n+k) refers to the quadrature component of a quadrature symbol at time n+k, I(k,m) refers to the in-phase component of the kth symbol in a sync word consistent with phase rotation/spectrum inversion hypothesis m, Q(k,m) refers to the quadrature component of the kth symbol in a sync word consistent with phase rotation/spectrum hypothesis m, and N is the number of symbols in the sync word.

In one embodiment, detection of the presence of a sync word is deemed to occur when a correlation value Corr(n,m) exceeds a predetermined threshold T. When detection of a sync word by one of the correlators occurs and is verified, the timing and location of the block boundary can be determined from the location n. In addition, the presence of spectral inversion or the lack thereof can be determined using the MSB of m; if equal to 1, a spectral inversion is deemed to have occurred, and if equal to 0, a spectral inversion is deemed to have not occurred. In addition, the phase rotation of the symbol constellation can be determined using the three LSBs of m (the value represented by these three LSBs multiplied by 45° is the phase rotation). This information is represented by numeral 614 in FIG. 6.

In addition to this, logic 616 may deduce other settings, parameters, and rates of the system from the empirically determined block size. These additional parameters, settings, and rates are identified with numeral 618 in FIG. 6.

In one implementation example, the other settings, parameters, and rates which can be deduced include external encoder type, the overall rate of a turbo encoder at the transmitter, and pilot symbol insertion protocol. In this implementation example, the following table illustrates the relationship between block size (excluding sync and pilot symbols), turbo encoder rate, and external encoder type:

|  | Rate 2/3 | Rate 3/4 | Rate 5/6 | Rate 8/9 |
| --- | --- | --- | --- | --- |
| CRC | 7572 | 6732 | 6050 | 5673 |
| R/S(187,195) | 7812 | 6936 | 6242 | 5853 |
| R/S(187,203) | 8124 | 7224 | 6498 | 6093 |

The following options are possible in this example regarding the insertion of pilot symbols:

Option 0: No insertion of pilot symbols

Option 1: Insertion of 4 pilot symbol sequences after the sync word

Option 2: Insertion of 12 pilot symbol sequences after the sync word

Option 3: Insertion of 28 pilot symbol sequences after the sync word

Option 4: Insertion of single pilot symbol sequence at each of 4 insertion positions depending on external encoder type Option 5: Insertion of 3 pilot symbol sequences at each of 4 insertion positions depending on external encoder type Option 6: Insertion of 7 pilot symbol sequences at each of 4 insertion positions depending on external encoder type One example of the pilot symbol sequence referred to above is the following 16 symbol sequence (expressed in terms of multiples of 45°, consistent with the use of an 8-PSK symbol constellation): 1, 5, 1, 3, 7, 1, 5, 3, 7, 3, 7, 1, 5, 3, 7, 5.

In one example, the four insertion positions for a CRC external encoder are indicated in the following table (the values represent the symbols after which the pilot symbols should be inserted):

|  | First Insertion Position | Second Insertion Position | Third Insertion Position | Fourth Insertion Position |
| --- | --- | --- | --- | --- |
| Rate 2/3 | 1515 | 3029 | 4543 | 6057 |
| Rate 3/4 | 1347 | 2693 | 4039 | 5385 |
| Rate 5/6 | 1210 | 2420 | 3630 | 4840 |
| Rate 8/9 | 1134 | 2269 | 3404 | 4539 |

In this example, the four insertion positions for a R/S (187,195) external encoder are indicated in the following table:

|  | First Insertion Position | Second Insertion Position | Third Insertion Position | Fourth Insertion Position |
| --- | --- | --- | --- | --- |
| Rate 2/3 | 1563 | 3125 | 4687 | 6249 |
| Rate 3/4 | 1386 | 2774 | 4162 | 5550 |
| Rate 5/6 | 1249 | 2497 | 3745 | 4993 |
| Rate 8/9 | 1170 | 2341 | 3512 | 4683 |

In this example, the four insertion positions for a R/S (187,203) external encoder are indicated in the following table:

|  | First Insertion Position | Second Insertion Position | Third Insertion Position | Fourth Insertion Position |
| --- | --- | --- | --- | --- |
| Rate 2/3 | 1626 | 3250 | 4874 | 6498 |
| Rate 3/4 | 1446 | 2890 | 4334 | 5778 |
| Rate 5/6 | 1299 | 2599 | 3899 | 5199 |
| Rate 8/9 | 1218 | 2437 | 3656 | 4875 |

In one implementation example, a sync word comprises the following 64 symbols (expressed in terms of multiples of 45°, consistent with the use of an 8-PSK symbol constellation): 0, 4, 4, 0, 0, 4, 4, 0, 0, 4, 4, 0, 0, 4, 4, 0, 0, 4, 4, 0, 2, 6, 0, 4, 2, 6, 4, 0, 2, 6, 0, 4, 2, 6, 2, 6, 4, 0, 2, 6, 2, 6, 0, 4, 4, 0, 2, 6, 0, 4, 4, 0, 0, 4, 2, 6, 2, 6, 4, 0, 2, 6, 6, 2.

From the foregoing, it will be seen that, with 3 possible external encoder types, 4 possible turbo encoder rates, and 6 possible pilot symbol insertion options, there will be 3*4*6 or 72 possible block sizes, each of which implies a particular one of the external encoder types, turbo encoder rates, and pilot symbol insertion options. Therefore, once the block size has been empirically determined (by counting the number of symbols between two successive sync words), these other parameters and settings can also be determined and used to configure the receiver.

Consider that I(k,0), Q(k,0), I(k,m), and Q(k,m) (as used in the expressions (2) above) can be expressed as follows:

$$I(k,0) = \cos\theta_k$$

$$Q(k,0) = \sin\theta_k$$

$$I(k,m) = \cos(\theta_k + m\pi/4) = \cos\theta_k \cos(m\pi/4) - \sin\theta_k \sin(m\pi/4) \quad (3)$$

$$Q(k,m) = \sin(\theta_k + m\pi/4) = \sin\theta_k \cos(m\pi/4) + \cos\theta_k \sin(m\pi/4)$$

Given the foregoing, the expressions (2) set forth previously can be restated as follows:

$$Corr(n, m) = \cos(m\pi/4)/N\left(\sum_{k=0}^{N-1} I(k,0)I(n+k) + Q(k,0)Q(n+k)\right) + \\ \sin(m\pi/4)/N\left(\sum_{k=0}^{N-1} I(k,0)Q(n+k) - Q(k,0)I(n+k)\right), \\ m = 0, 1, \ldots, 7 \quad (4)$$

$$Corr(n, m) = \cos(m\pi/4)/N\left(\sum_{k=0}^{N-1} I(k,0)I(n+k) - Q(k,0)Q(n+k)\right) - \\ \sin(m\pi/4)/N\left(\sum_{k=0}^{N-1} I(k,0)Q(n+k) + Q(k,0)I(n+k)\right), \\ m = 8, 9, \ldots, 15 \quad (5)$$

Let Corr1(n,0), Corr2(n,0), Corr3(n,0) and Corr4(n,0) refer to the following:

$$Corr1(n, 0) = 1\Big/N\left(\sum_{k=0}^{N-1} I(k,0)I(n+k)\right) \quad (6)$$

$$Corr2(n, 0) = 1\Big/N\left(\sum_{k=0}^{N-1} Q(k,0)Q(n+k)\right)$$

$$Corr3(n, 0) = 1\Big/N\left(\sum_{k=0}^{N-1} I(k,0)Q(n+k)\right)$$

$$Corr4(n, 0) = 1\Big/N\left(\sum_{k=0}^{N-1} Q(k,0)I(n+k)\right)$$

Then, the expressions (4) and (5) above can be restated as follows:

Corr(n,m)=Cos(mπ/4){Corr1(n,0)+Corr2(n,0)}+Sin
(mπ/4){Corr3(n,0)−Corr4(n,0)}, m=0, 1, . . . , 7  (7)

Corr(n,m)=Cos(mπ/4){Corr1(n,0)−Corr2(n,0)}−Sin
(mπ/4){Corr3(n,0)+Corr4(n,0)}, m=8, 9, . . . ,
15  (8)

Generalizing to the case of an MPSK symbol constellation, where M can be represented as $2^p$, and p is an integer greater than or equal to 1, expressions (7) and (8) become:

Corr(n,m)=Cos(2mπ/M){Corr1(n,0)+Corr2(n,0)}+Sin
(2mπ/M){Corr3(n,0)−Corr4(n,0)}, m=0, 1, . . . ,
M−1  (9)

Corr(n,m)=Cos(2mπ/M){Corr1(n,0)−Corr2(n,0)}−Sin
(2mπ/M){Corr3(n,0)+Corr4(n,0)}, m=M, . . . ,
2M−1  (10)

From the foregoing expressions (9) and (10), it can be seen that Corr(n,m) can be determined from 4 correlators which determine respectively Corr1(n,0), Corr2(n,0), Corr3(n,0), and Corr4(n,0).

Figure 7:
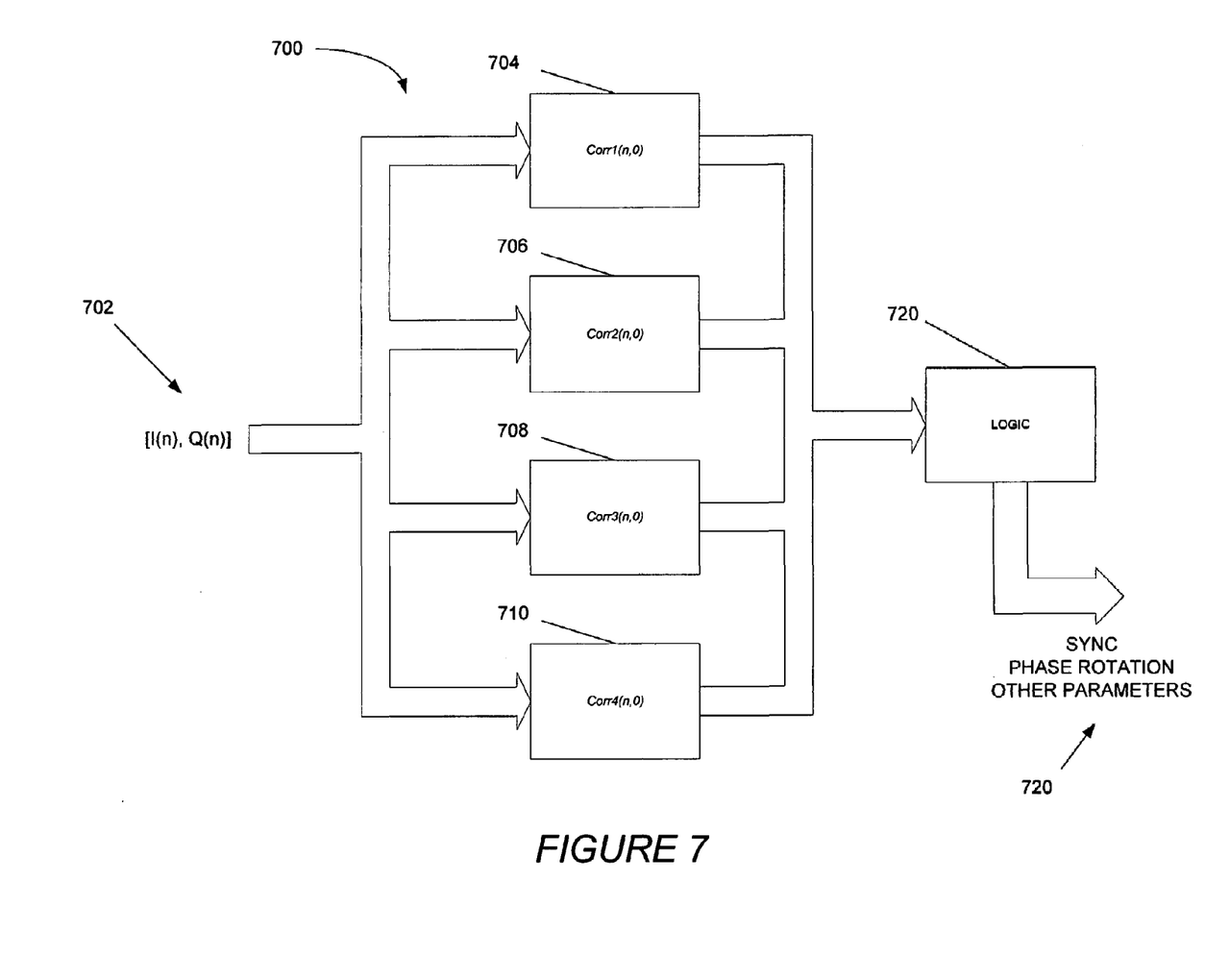
FIG. 7 is a block diagram of one implementation example of sync data detection logic.

FIG. 7 illustrates an implementation of the sync data detection logic 208 which implements the foregoing expressions (7) and (8). As illustrated, a quadrature symbol [I(n), Q(n)], identified with numeral 702, is input from the demodulator at time n. Four correlators are included, identified respectively with numerals 704, 706, 708, and 710, for computing, respectively, Corr1(n,0), Corr2(n,0), Corr3(n,0), and Corr4(n,0) at time n. The outputs of each of these correlators are provided to logic 720 which computes Corr(n,m), ∀m, 0≦m≦15, in accordance with the expressions (7) and (8) set forth above. This logic is also configured to determine the timing of block boundaries, the phase rotation of the symbol constellation, and the presence or lack thereof of spectrum inversion, and to communicate the same to other components of the receiver over signal line 720, all as described previously. Moreover, in the case where system settings, parameters, and rates may vary, the logic 720 may also be configured to empirically determine the number of symbols per block (by counting the number of symbols between successive sync words), determine the settings, parameters and rates which are implied thereby, and communicates these settings, parameters, and rates to other components of the receiver, all as described previously, so the same can configure themselves accordingly.

It should be appreciated that embodiments are possible where the logic 120, 208, and 720 in the foregoing figures is implemented as hardware, software or a combination of hardware and software. Furthermore, embodiments are possible where the logic 120, 208, and 720 is implemented separately from the other components of the receiver or transmitter as the case may be, or integrated with one or more of the other components of the transmitter or receiver such as modulator 122 or demodulator 204 as the case may be. Moreover, embodiments are possible where the symbol constellation is other than 8-PSK. One of ordinary skill in the art, from a reading of this disclosure, will appreciate that the principles of the invention can be applied in relation to any higher order symbol constellation, including but not limited to QPSK, 16-QAM, 64-QAM, etc. Also, one of ordinary skill in the art will appreciate that the invention is applicable to any wireless communication system without limitation to satellite broadcast systems, and to the transmission of data other than MPEG data. One of ordinary skill in the art will also appreciate that the invention encompasses transmitters which employ turbo encoders other than serial turbo encoders (such as parallel turbo encoders), and encoders other than turbo encoders. One of skill in the art will further appreciate than the invention encompasses receivers which employ turbo decoders other than serial turbo decoders (such as parallel turbo encoders), and encoders other than turbo encoders.

Figure 8A:
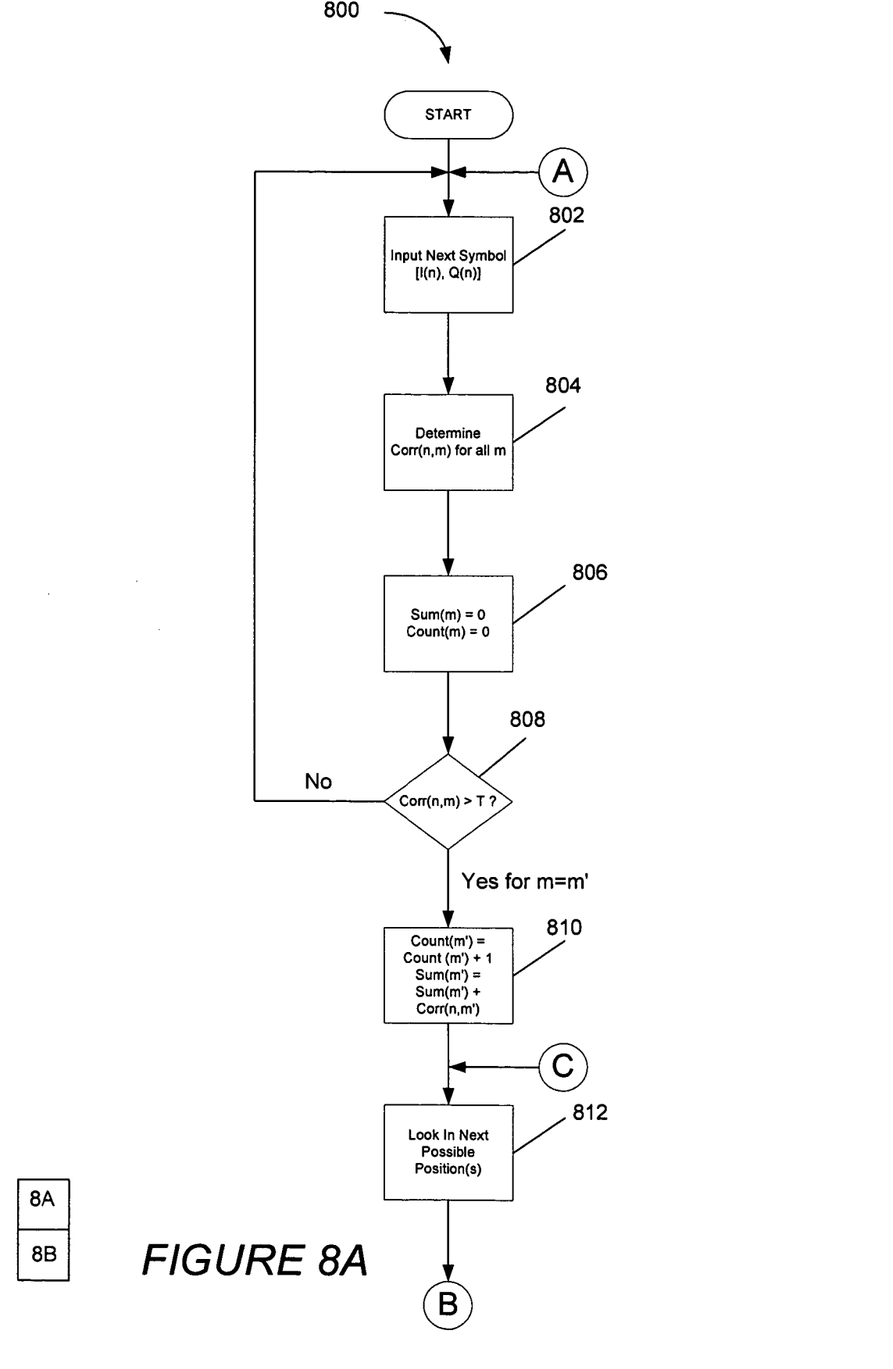
FIGS. 8A–8B illustrate a flowchart of one embodiment of a method for synchronizing a receiver according to the invention.
Figure 8B:
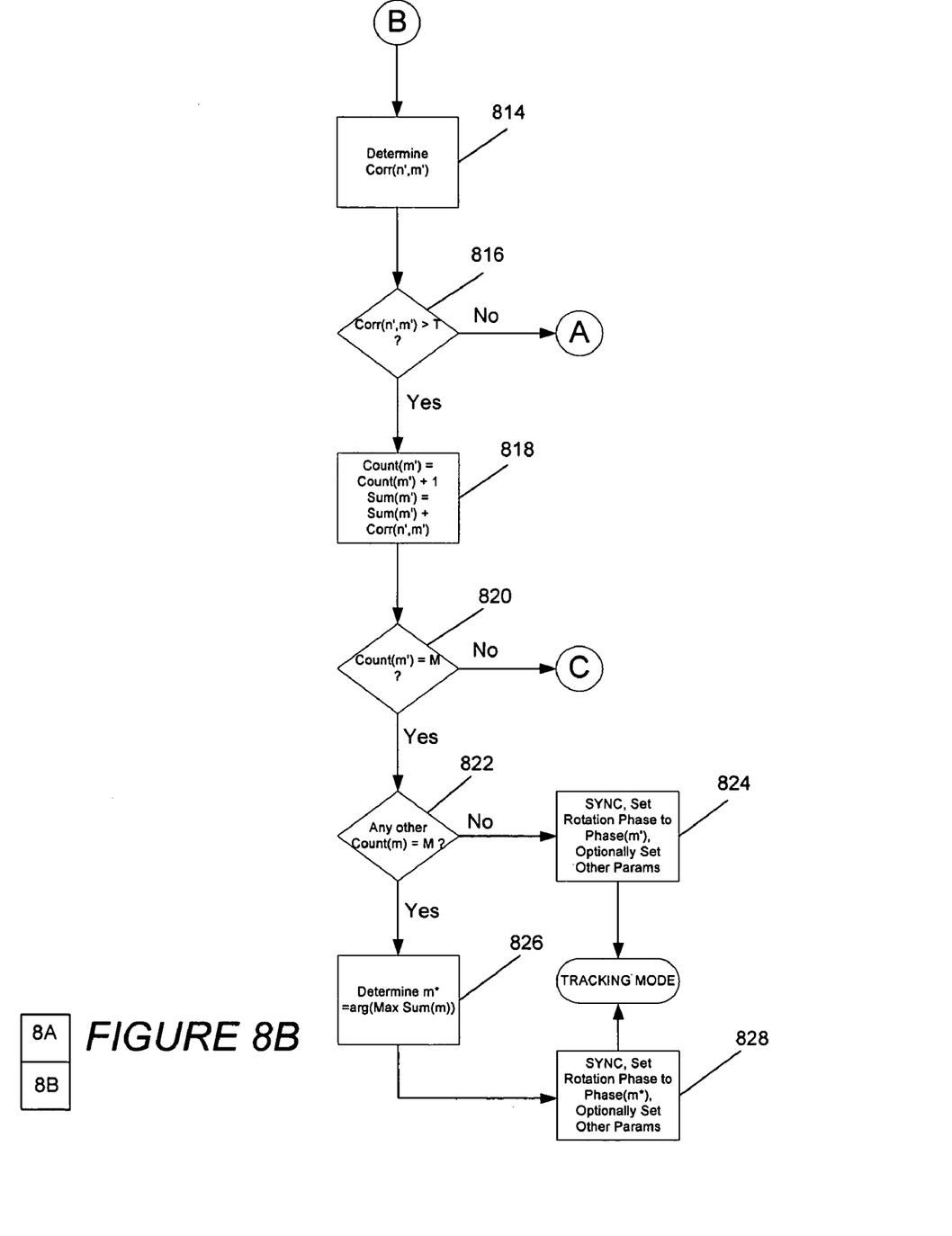

A flowchart of an embodiment 800 of a method of operation for the sync data detection logic 208 is illustrated in FIGS. 8A–8B. Upon commencement, the method enters an acquisition mode. Upon entering the acquisition mode, the method proceeds to step 802. In step 802, at time n, a quadrature symbol [I(n), Q(n)] from the demodulator is input and stored. In one implementation, symbols from the demodulator are successively shifted into a shift register of length N such that, at time n, after the performance of step 802, the shift register contains [I(n+k), Q(n+k)], 0≦k≦N−1.

Step 802 is followed by step 804, where the method determines Corr(n,m), ∀m, 0≦m≦15. In one implementation, the values Corr(n,m), ∀m, 0≦m≦15, at a time n are each determined in parallel using the expressions (2) set forth previously. In another implementation, the values Corr(n,m), ∀m, 0≦m≦15, at a time n are determined concurrently or sequentially using the expressions (7) and (8) set forth previously.

Step 804 is followed by step 806, in which the parameters Sum(m) and Count(m), ∀m, 0≦m≦15, are initialized to 0. The parameter Count(m) represents the number of times a sync word consistent with the mth phase rotation/spectrum inversion hypothesis, ∀m, 0≦m≦15, has been detected. The parameter Sum(m) represents the reliability of the detections represented by Count(m).

Step 806 is followed by step 808, in which each the values Corr(n,m), ∀m, 0≦m≦15, is compared to a predetermined threshold T. If none of the values exceeds the threshold T, a loop back to step 802 is performed, and the acquisition portion of the method restarted after a next successive symbol from the demodulator is input.

If one of the values Corr(n,m) exceeds the threshold (assume Corr(n,m') does), the method proceeds to step 810. This signifies that the hypothesis represented by m' has become more likely. In step 810, the parameter Count(m') is incremented, and the value Corr(n,m') is added to Sum(m').

Step 812 follows step 810. In step 812, the method checks for the presence of sync data consistent with hypothesis m' at the next possible one or more locations. In a system where the block size is fixed, there will be only one next possible location, the block size added to the location where the initial sync data was detected. In a system where the block size is a variable, there may be many possible locations. These possible locations can be determined by adding all the possible blocks sizes to the location where the initial sync word was detected.

Step 814 is then performed. Letting n' represent all the possible locations of the next sync word, in step 814, the parameter Corr(n',m'), ∀n', is computed.

Step 816 follows step 814. In step 816, the parameter Corr(n',m'), ∀n', is compared with the predetermined threshold T. If the threshold is not exceeded, a false alarm for hypothesis m' is assumed, and the method loops back to step 802, where the acquisition portion of the method is restarted.

If the threshold is exceeded, indicating that the hypothesis m' has again increased in likelihood, the method proceeds to step 818, where the parameter Count(m') is incremented, and the value Corr(n',m') is added to Sum(m').

Step 820 follows step 818. In step 820, it is determined whether Count(m')=M, that is, whether the sync word for hypothesis m' has been detected at M successive block boundaries. If not, the method looks back to step 812, where it continues looking for sync words consistent with hypothesis m' at possible block boundaries. If so, the method proceeds to step 822.

In step 822, the method determines if any other hypothesis has been validated through detection of M successive sync words consistent with the hypothesis. If not, step 824 is performed, where hypothesis m' is confirmed, a SYNC signal indicating the timing of block boundaries is communicated to other components of the receiver, and the phase rotation and spectrum inversion consistent with hypothesis m' is communicated to the demodulator. Furthermore, in the case in which the block size is variable, the block size may be empirically determined (again, by counting the number of symbols between successive sync words). The parameters, settings and rates implied by the block size may then be determined and communicated to other components in the receiver.

The method then enters a tracking mode of operation in which it continues to apply hypothesis m' (by sending out a sync signal when the sync word for hypothesis m' is detected at block boundaries, and by having the demodulator pre-rotate and/or pre-invert symbols to reflect the phase rotation and spectrum inversion implied by hypothesis m') until a predetermined number of K successive sync failures is detected. If K successive sync failures are detected, the method restarts the acquisition process at step 812. If not, the method continue to apply hypothesis m'. In one implementation, a sync failure is deemed to have occurred if a sync word consistent with hypothesis m' is not present at an expected location, i.e., block boundary.

In step 822, if another hypothesis besides m' has been validated (through M successive detections of the sync word for the hypothesis at block boundaries), the method proceeds to step 826. In step 826, the method selects amongst the competing hypotheses by selecting the hypothesis m* which has the maximum value of Sum(m).

The method then proceeds to step 828, where it communicates to other components of the receiver timing, phase rotation, spectrum inversion, and optionally other settings, rates, and parameters, consistent with hypothesis m*. The method then enters the tracking mode.

Note that, in one implementation, when a phase rotation of r*45° has been detected, the system changes the zero reference phase to the detected phase rotation. It then reassigns the 16 phase rotation/spectrum inversion hypotheses to different values of m to reflect this change. In one implementation, letting r refer to the phase rotation, the following pseudo-code indicates the reassignments which occur:

```
If r < 8,
    then
        if m < 8,
            then
                if m > r - 1
                    then m = m - r
                    else m = m - r + 8
            else
                if m > r + 7
                    then m = m - r
                    else m = m - r + 8
    else
        r = r - 8
        if m < 8
            then m = m + 8
            else m = m - 8
```

Consider for example, a phase rotation of 225°, which represents a value r=5. The reassignments which are implemented as a result of this phase rotation are in the following table:

| Original Index | New Index | Phase Rotation | Spectrum Inversion |
|---|---|---|---|
| 0 | 3 | 0° | No |
| 1 | 4 | 45° | No |
| 2 | 5 | 90° | No |
| 3 | 6 | 135° | No |
| 4 | 7 | 180° | No |
| 5 | 0 | 225° | No |
| 6 | 1 | 270° | No |
| 7 | 2 | 315° | No |
| 8 | 11 | 0° | Yes |
| 9 | 12 | 45° | Yes |
| 10 | 13 | 90° | Yes |
| 11 | 14 | 135° | Yes |
| 12 | 15 | 180° | Yes |
| 13 | 8 | 225° | Yes |
| 14 | 9 | 270° | Yes |
| 15 | 10 | 315° | Yes |

Although the foregoing methods assume an 8-PSK symbol constellation, one of ordinary skill in the art will, from a reading of this disclosure, appreciate that these methods can readily be applied to any higher order symbol constellation including without limitation QPSK, 16-QAM, and 64-QAM.

Any of the methods of the subject invention may be tangibly embodied as a series of processor executable instructions stored on a processor readable medium or memory including without limitation RAM, ROM, EPROM, EEPROM, NVROM, flash memory, floppy disk, hard disk, CD-ROM, DVD, tape, etc. The processor readable medium may, in turn, be a component of a system comprising the processor readable medium, and a processor configured to access the medium and execute the instructions stored thereon embodying a method of the invention.

Any of the methods of the invention may also be tangibly embodied as a series of instructions stored on a client or server. The client or server may in turn be a component of a system comprising the client, the server, and a network, where the client is configured to be able to access the server over the network. In one embodiment, the method is tangibly embodied on the server, and the client spawns a request to the server over the network. In response, the instructions embodying the method are either executed as maintained on the server, or they are transferred over the network to the client for execution. The network may be a proprietary network or it may be a public network such as the Internet operating in accordance with a known standard such as TCP/IP.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A receiver for receiving one or more signals over a communications channel, the receiver comprising:
    a demodulator for demodulating the one or more signals into one or more blocks of encoded symbols, wherein the number of encoded symbols in a block may vary with one or more system parameters;
    sync data detection logic for detecting unencoded sync data at block boundaries and, based thereon, determining (a) synchronization information for one or more components of the receiver; and (b) one or more system parameters; and
    one or more decoders for decoding the one or more blocks of encoded symbols.

2. The receiver of claim 1 wherein the sync data detection logic also derives the one or more system parameters from a count of the number of symbols between successive instances of the sync data.

3. Sync data detection logic comprising:
    a plurality of correlators, each configured to test at least one of a plurality of hypotheses by correlating sync data with encoded symbols, wherein the number of encoded symbols in a block may vary with one or more system parameters, and wherein the sync data for a correlator reflects the one or more hypotheses being tested by the correlator; and
    logic which, upon validating at least one of the hypotheses being tested by the correlators, jointly determines synchronization information and one or more system parameters, wherein the one or more system parameters are determined from a count of the number of encoded symbols in a block, sync data, or both, and the logic outputs one or more signals representative thereof.

4. A method of synchronizing a receiver in a communications system comprising:
    receiving one or more blocks of encoded symbols with unencoded sync data at block boundaries, wherein the number of encoded symbols in a block may vary with one or more system parameters;
    detecting one or more instances of sync data at block boundaries; and
    based on the detected sync data, (a) determining synchronization information for one or more components of the receiver, and (b) determining one or more system parameters.

5. The method of claim 4 further comprising deriving the one or more system parameters from unencoded sync data and a count of the number of symbols between successive instances of the sync data.

6. A receiver for receiving one or more signals as transmitted over a communications channel, the receiver comprising:
    demodulator means for demodulating the one or more signals into blocks of encoded symbols, wherein the number of encoded symbols in a block may vary with one or more system parameters;
    decoder means for decoding the blocks of encoded symbols into blocks of data; and
    sync data detection logic means f& detecting unencoded sync data at block boundaries and, based thereon, determining (a) synchronization information for one or more components of the receiver; and (b) one or more system parameters.

7. The receiver of claim 6 wherein the sync data detection logic derives the one or more system parameters from unencoded sync data and a count of the number of symbols between successive instances of the sync data.

* * * * *

UNITED STATES PATENT AND TRADEMARK OFFICE
CERTIFICATE OF CORRECTION

PATENT NO. : 7,065,703 B2
APPLICATION NO. : 10/893673
DATED : June 20, 2006
INVENTOR(S) : Abraham Krieger It is certified that error appears in the above-identified patent and that said Letters Patent is hereby corrected as shown below:

Column 16, at line 41, please delete "f&" and insert --for--.

Signed and Sealed this

Third Day of October, 2006

JON W. DUDAS
*Director of the United States Patent and Trademark Office*